(12) United States Patent
Kawasaki

(10) Patent No.: US 11,827,042 B2
(45) Date of Patent: Nov. 28, 2023

(54) TAG WRITING DEVICE, LABEL PRINTER, AND INFORMATION PROCESSING PROGRAM

(71) Applicant: TOSHIBA TEC KABUSHIKI KAISHA, Tokyo (JP)

(72) Inventor: Yuki Kawasaki, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 402 days.

(21) Appl. No.: 17/315,394

(22) Filed: May 10, 2021

(65) Prior Publication Data
US 2022/0176714 A1    Jun. 9, 2022

(30) Foreign Application Priority Data
Dec. 3, 2020    (JP) ................. 2020-200904

(51) Int. Cl.
  H04B 1/02        (2006.01)
  B41J 3/50        (2006.01)
  B41J 3/407       (2006.01)
  G06K 17/00       (2006.01)
  G01S 5/02        (2010.01)

(52) U.S. Cl.
  CPC ............... B41J 3/50 (2013.01); B41J 3/4075 (2013.01); G01S 5/0284 (2013.01); G01S 5/0295 (2020.05); G06K 17/0025 (2013.01)

(58) Field of Classification Search
  CPC . B41J 3/4075; B41J 3/50; B41J 11/663; B41J 11/70; G06F 3/125; G06F 3/1285; G01S 5/0295; G01S 5/0284
  See application file for complete search history.

(56) References Cited

U.S. PATENT DOCUMENTS 9,013,530 B2 *  4/2015  Koike ................... B41J 11/663
                                             347/220
9,498,982 B2 * 11/2016  Kasuga ................. B41J 3/4075
(Continued)

FOREIGN PATENT DOCUMENTS

JP        2003-178271        6/2003

OTHER PUBLICATIONS

Extended European Search Report for European Patent Application No. 21179740.2 dated Nov. 12, 2021.

*Primary Examiner* — Nhan T Le
(74) *Attorney, Agent, or Firm* — AMIN, TUROCY & WATSON, LLP

(57) ABSTRACT

A tag writing device includes a conveying unit, an antenna, an acquiring unit, a determining unit, a selecting unit, and a deciding unit. The acquiring unit acquires reception intensities about a plurality of wireless tags. The determining unit determines an intermediate position between a start position and an end position as a position where a sum of reception intensities acquired while a mount is conveyed from the start position to the intermediate position and a sum of reception intensities acquired while the mount is conveyed from the intermediate position to the end position are closest. The selecting unit selects, as a target tag, the wireless tag, the intermediate position of which is determined as a position within a prediction range. The deciding unit decides a relative positional relation between the wireless tag and the antenna at a time when writing is performed.

20 Claims, 8 Drawing Sheets

(56) References Cited

U.S. PATENT DOCUMENTS

| | | | |
|---|---|---|---|
| 10,564,278 B2 * | 2/2020 | Cristache | G01S 5/0289 |
| 2014/0035733 A1 | 2/2014 | Yamamoto | |
| 2015/0199594 A1 | 7/2015 | Kuniya | |
| 2019/0232683 A1 | 8/2019 | Koike et al. | |
| 2020/0012827 A1 | 1/2020 | Koike | |
| 2020/0215827 A1 | 7/2020 | Koike et al. | |
| 2021/0064951 A1 | 3/2021 | Koike | |

* cited by examiner

TAG WRITING DEVICE, LABEL PRINTER, AND INFORMATION PROCESSING PROGRAM

CROSS-REFERENCE TO RELATED APPLICATION

This application is based upon and claims the benefit of priority from Japanese Patent Application No. P2020-200904, filed on Dec. 3, 2020, the entire contents of which are incorporated herein by reference.

FIELD

Embodiments described herein relate generally to a tag writing device, a label printer, and an information processing program.

BACKGROUND

There has been known a label printer that performs printing on a label and writes information in a wireless tag attached to the label.

In the label printer of this type, if labels of a plurality of types in which, for example, types of wireless tags are different or attached positions of wireless tags are different are made selectively usable, an optimum relationship between relative positions of a writing target wireless tag and an antenna sometimes changes depending on a type of a label to be used.

Therefore, it is necessary to correctly perform calibration for determining an optimum relative positional relation between a wireless tag and an antenna concerning a set label.

Under such circumstances, it has been desired to be able to properly determine an optimum relative positional relation between a wireless tag and an antenna.

DETAILED DESCRIPTION

An aspect of embodiments is to provide, in order to solve the problems described above, a tag writing device, a label printer, and an information processing program that can correctly perform calibration for determining an optimum relative positional relation between a wireless tag and an antenna.

A tag writing device according to an embodiment includes a conveying unit, an antenna, an acquiring unit, a determining unit, a selecting unit, and a deciding unit. The conveying unit conveys a mount, to which a plurality of wireless tags are attached in a row at equal intervals, along an array direction of the plurality of wireless tags. The antenna is disposed to be opposed to the mount conveyed by the conveying unit and is provided for wireless communication with a plurality of wireless tags located within a communication range among the plurality of wireless tags. The acquiring unit acquires, in a period in which the mount is conveyed by the conveying unit from a predetermined start position to a predetermined end position, a plurality of times every time the mount is conveyed by the conveying unit by a fixed amount, reception intensities in the antenna of radio signals transmitted from the plurality of wireless tags. The determining unit determines, concerning each of the plurality of wireless tags, an intermediate position between the start position and the end position as a position where a sum of reception intensities acquired by the acquiring unit while the mount is conveyed from the start position to the intermediate position by the conveying unit and a sum of reception intensities acquired by the acquiring unit while the mount is conveyed from the intermediate position to the end position by the conveying unit are closest. The selecting unit selects, as a target tag, the wireless tag, the intermediate position of which is determined by the determining unit as a position within a prediction range predetermined as a range included in a range between the start position and the end position. The deciding unit decides, based on reception intensity in the antenna of a radio signal transmitted from the target tag selected by the selecting unit, a relative positional relation between the wireless tag and the antenna at a time when writing is performed in one of the plurality of wireless tags.

Embodiments are explained below with reference to the drawings.

First Embodiment

Figure 1:
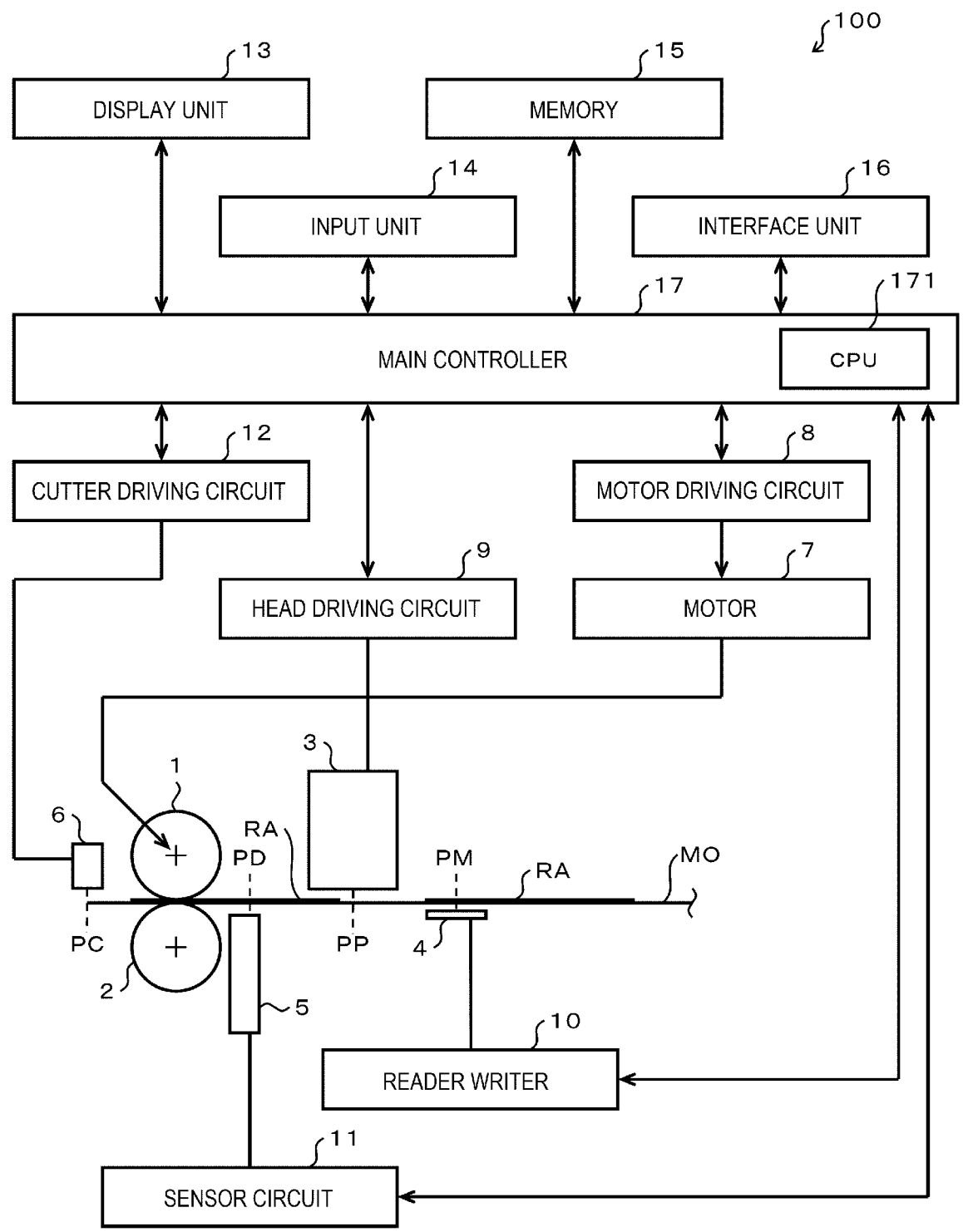
FIG. 1 is a diagram illustrating the structure of a part of and a main part circuit configuration of a label printer according to a first embodiment.

FIG. 1 is a diagram illustrating the structure of a part of and a main part circuit configuration of a label printer 100 according to a first embodiment.

The label printer 100 prints, while conveying an elongated mount MO, an image representing characters and the like on label paper RA stuck to one surface (hereinafter referred to as front surface) of the mount MO. The label printer 100 writes data in a wireless tag attached to the label paper RA. The material of the mount MO and the label paper RA is typically paper but may be a material other than the paper such as resin. The materials of the mount MO and the label paper RA may be different from each other. In this embodiment, the label paper RA is heat-sensitive paper. As the wireless tag, for example, an RFID (radio frequency identifier) tag can be used.

Figure 2:
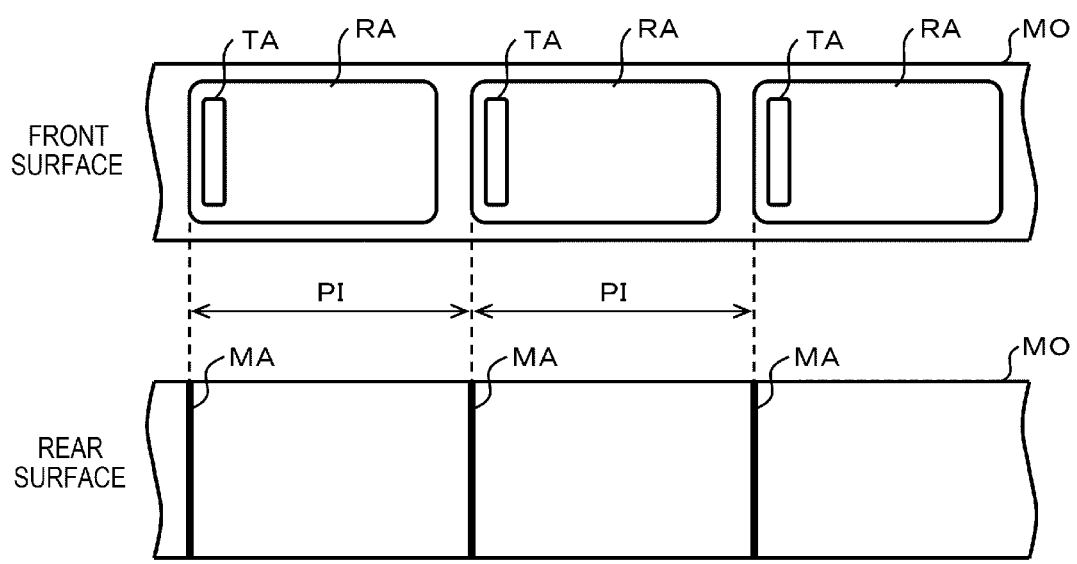
FIG. 2 is a diagram illustrating exteriors of a front surface and a rear surface of a mount.

FIG. 2 is a diagram illustrating the exteriors of a front surface and a rear surface of the mount MO.

A plurality of label papers RA are stuck to the front surface of the mount MO in a row at equal intervals along the longitudinal direction of the mount MO. That is, the plurality of label papers RA are arranged on the front surface of the mount MO in a row at a pitch PI. In the following explanation, the longitudinal direction of the mount MO is simply referred to as "longitudinal direction". A wireless tag TA is attached to each of the label papers RA. In this embodiment, an attached position of the wireless tag TA in the label paper RA is near one end portion of the label paper RA. However, the attached position of the wireless tag TA in the label paper RA is not limited to this.

On the rear surface of the mount MO, a mark MA is formed in a position corresponding to an end portion on a downstream side in a feed direction among end portions of the label paper RA. In this embodiment, the mark MA is a straight line in a direction crossing the longitudinal direction. However, the mark MA may be any form if the mark MA represents the position of the end portion.

The label printer 100 includes conveying rollers 1 and 2, a print head 3, an antenna 4, a mark sensor 5, a cutter 6, a motor 7, a motor driving circuit 8, a head driving circuit 9, a reader writer 10, a sensor circuit 11, a cutter driving circuit 12, a display unit 13, an input unit 14, a memory 15, an interface unit 16, and a main controller 17.

Both of the conveying rollers 1 and 2 are disposed to be opposed to each other in a state in which axes are directed in the depth direction in FIG. 1. The conveying rollers 1 and 2 hold the mount MO and rotate around the axes to convey the mount MO. Both of the conveying rollers 1 and 2 are capable of rotating clockwise and counterclockwise in FIG. 1 and capable of conveying the mount MO in both of a direction toward the left side in FIG. 1 (hereinafter referred to as forward direction) and a direction toward the right side in FIG. 1 (hereinafter referred to as back direction).

The print head 3 is disposed to be opposed to the front surface side of the mount MO conveyed by the conveying rollers 1 and 2 and prints an image on the label paper RA. A print position PP where the print head 3 prints an image on the label paper RA is a position further on an upstream side in the forward direction than a position where the mount MO is held by the conveying rollers 1 and 2. In this embodiment, the print head 3 is a thermal-type print head. However, the print head 3 can be replaced with devices of a thermal transfer type, a dot impact type, an inkjet type, and other various types.

The antenna 4 is disposed to be opposed to the rear surface side of the mount MO conveyed by the conveying rollers 1 and 2. However, the antenna 4 may be disposed to be opposed to the front surface side of the mount MO. The antenna 4 radiates a radio wave to be received by a wireless tag attached to the label paper RA to the wireless tag. The antenna 4 receives a radio wave radiated from the wireless tag attached to the label paper RA and generates an electric signal corresponding to the radio wave. A center position PM of the antenna 4 along a conveying direction of the mount MO is further on the upstream in the forward direction than the print position PP.

The mark sensor 5 is disposed to be opposed to the rear surface side of the mount MO conveyed by the conveying rollers 1 and 2. The mark sensor 5 detects the mark MA formed on the rear surface of the mount MO. A detection position PD of the mark MA by the mark sensor 5 is a position between the position where the mount MO is held by the conveying rollers 1 and 2 and the print position PP.

The cutter 6 cuts the mount MO. A cut position PC where the cutter 6 cuts the mount MO is a position further on the downstream side in the forward direction than the position where the mount MO is held by the conveying rollers 1 and 2.

The motor 7 generates a rotational force. The rotational force generated by the motor 7 is transmitted to the conveying roller 1 via a gear or the like to rotate the conveying roller 1. The rotational force generated by the motor 7 may be transmitted to the conveying roller 2 via a gear or the like to rotate the conveying roller 2.

The motor driving circuit 8 drives, under control by the main controller 17, the motor 7 to generate a required rotational force.

The head driving circuit 9 drives, under the control by the main controller 17, the print head 3 to print any image on the label paper RA.

The reader writer 10 extracts, from an electric signal obtained by the antenna 4 according to a radio wave radiated from the wireless tag TA, response data transmitted by the wireless tag TA. The reader writer 10 supplies, to the antenna 4, a transmission signal for wirelessly transmitting data to be written in the wireless tag TA to the wireless tag TA. The reader writer 10 has a function of, in a situation in which a radio wave transmitted from the wireless tag TA is received by the antenna 4, measuring reception intensity of the radio wave. In this embodiment, reception electric field intensity (receive signal strength indicator: RSSI) is used as the reception intensity. The reader writer 10 outputs a measured RSSI together with an identifier for identifying the wireless tag TA that transmits a radio wave concerning the RSSI. In a situation in which radio waves respectively transmitted from a plurality of wireless tags TA are received by the antenna 4, the reader writer 10 measures an RSSI of each of the radio waves and outputs the RSSI together with an identifier for identifying the individual wireless tag TA.

The sensor circuit 11 detects based on an output signal of the mark sensor 5 that the mark MA reaches the detection position PD.

The cutter driving circuit 12 drives, under the control by the main controller 17, the cutter 6 to cut the mount MO.

The display unit 13 performs various display operations for notifying various kinds of information to an operator. As the display unit 13, well-known display devices such as a screen display device such as a liquid crystal display and a light emitting device such as an LED lamp can be used alone or in combination.

Various instructions by the operator are input to the input unit 14. As the input unit 14, well-known input devices such as a touch sensor, a key switch, and a keyboard can be used alone or in combination.

As the display unit 13 and the input unit 14, a single touch panel may be used.

The memory 15 saves data concerning an image to be printed on the label paper RA or data to be written in the wireless tag TA.

The interface unit 16 performs communication processing for exchanging data with an external information terminal device or the like. As the interface unit 16, for example, a well-known communication device conforming to the LAN (local area network) standard can be used.

The main controller 17 includes a CPU 171. The main controller 17 controls, according to information processing by the CPU 171, in order to realize operation of the label printer 100, the units such as the motor driving circuit 8, the head driving circuit 9, the reader writer 10, the sensor circuit 11, the cutter driving circuit 12, the display unit 13, the input unit 14, the memory 15, and the interface unit 16. As the main controller 17, for example, a microcomputer including, besides the CPU 171, a memory for storing an information processing program, which describes information processing by the CPU 171, and to be used by the CPU 171 as a work area can be used.

The operation of the label printer 100 configured as explained above is explained. Content of processing explained below is an example. A change of order of a part of the processing, omission of a part of the processing, addition of other processing, or the like is possible as appropriate.

The label printer 100 is used to, for example, issue labels stuck to commodities displayed and sold in a store. In the case of this use, the label printer 100 writes, in the wireless tag TA, tag data for causing a POS terminal or the like to capture a sales price and the like and prints an image representing the sales price and the like on the label paper RA to which the wireless tag TA is stuck. If a relative positional relation between the writing target wireless tag TA and the antenna 4 is in a state in which communication with the writing target wireless tag can be satisfactorily performed, the writing of the tag data in the wireless tag TA is performed by the reader writer 10 transmitting a radio signal for writing via the antenna 4 under control by the CPU 171. That is, a function of a transmitting unit is realized by cooperation of a computer including the CPU 171 as a central part and the reader writer 10. The print of the image on the label paper RA is performed by the driving circuit 9 driving the print head 3 under the control by the CPU 171. That is, a function of a print unit is realized by the print head 3 and the head driving circuit 9.

The label printer 100 allows a plurality of types of label papers RA to be selectively attached. The pitch PI, the length of the label paper RA in the longitudinal direction, an attached position of the wireless tag TA in the label paper RA, a wireless communication characteristic of the wireless tag TA, or the like is sometimes different depending on a type of the label paper RA. Consequently, a relative positional relation between the label paper RA and the antenna 4 suitable for writing data in the wireless tag TA is sometimes different depending on the type of the label paper RA. Therefore, calibration for determining the relative positional relation between the label paper RA and the antenna 4 suitable for writing data in the wireless tag TA is executed if a type of the label paper RA to be attached is changed. A characteristic operation in this embodiment is operation concerning the calibration. Therefore, the operation is explained below.

If a predetermined execution condition is satisfied, the CPU 171 starts information processing for the calibration.

Figure 3:
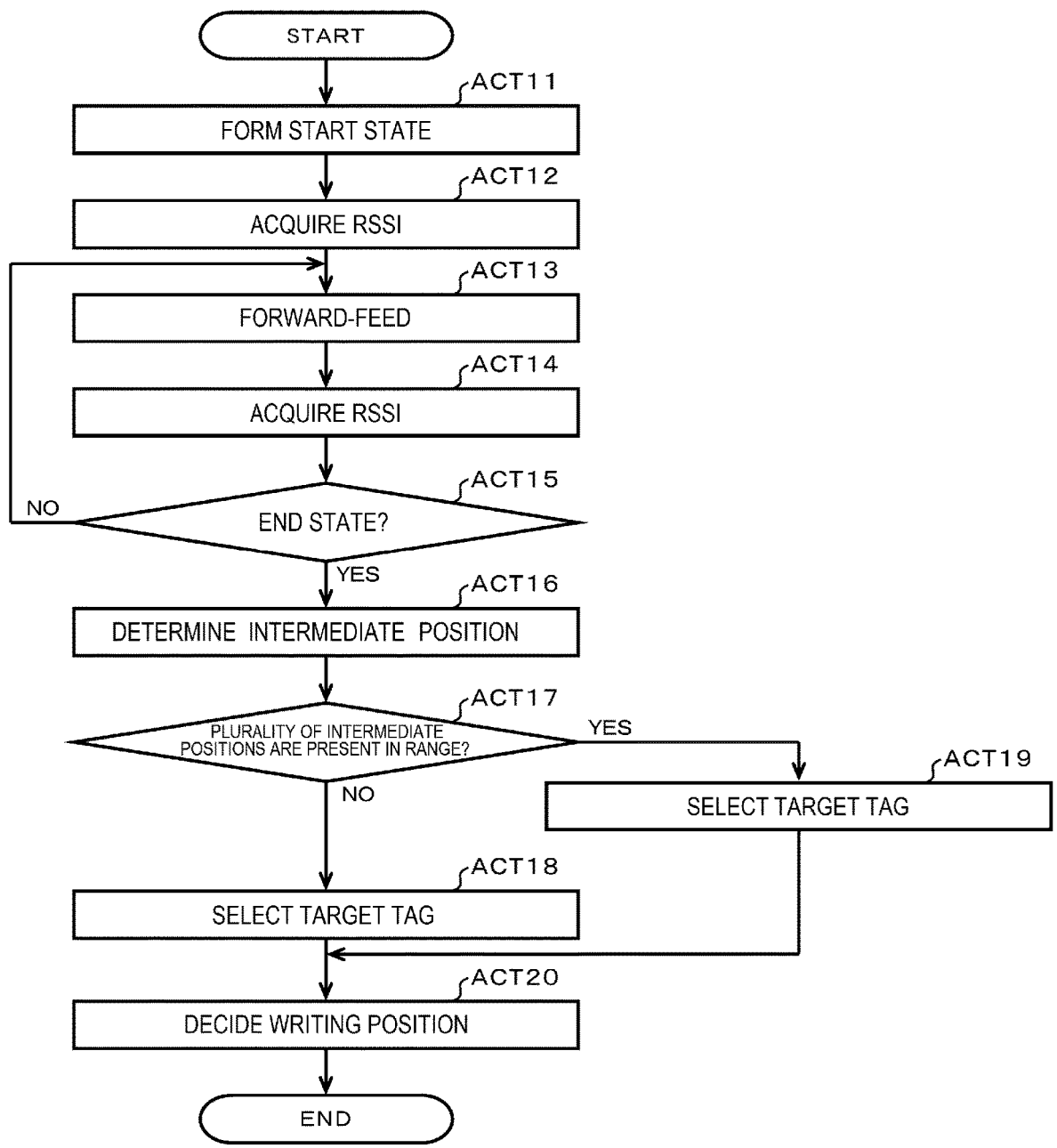
FIG. 3 is a flowchart of information processing by a CPU in FIG. 1 for calibration.

FIG. 3 is a flowchart of the information processing by the CPU 171 for the calibration.

In ACT 11, the CPU 171 forms a start state of the calibration. The start state is, for example, a state in which the center of the label paper RA is aligned with the center position PM of the antenna 4. For example, the CPU 171 instructs the motor driving circuit 8 to start conveyance of the mount MO in the forward direction (hereinafter referred to a forward feed). According to the instruction, the motor driving circuit 8 rotates the motor 7 to forward-feed the mount MO. If the motor 7 starts rotation, the conveying roller 1 rotates clockwise with a rotational force of the rotation and forward-feeds the mount MO. In this way, a function of a conveying unit that conveys a mount is realized by the conveying rollers 1 and 2, the motor 7, and the motor driving circuit 8. If the mark MA reaches the detection position PD, a change occurs in an output of the mark sensor 5. The sensor circuit 11 detects the mark MA in response to the change in the output. The CPU 171 instructs the motor driving circuit 8 to stop according to the detection of the mark MA by the sensor circuit 11. The motor driving circuit 8 stops the motor 7 according to the instruction, whereby the mark MA on the mount MO is located in the detection position PD.

Figure 4:
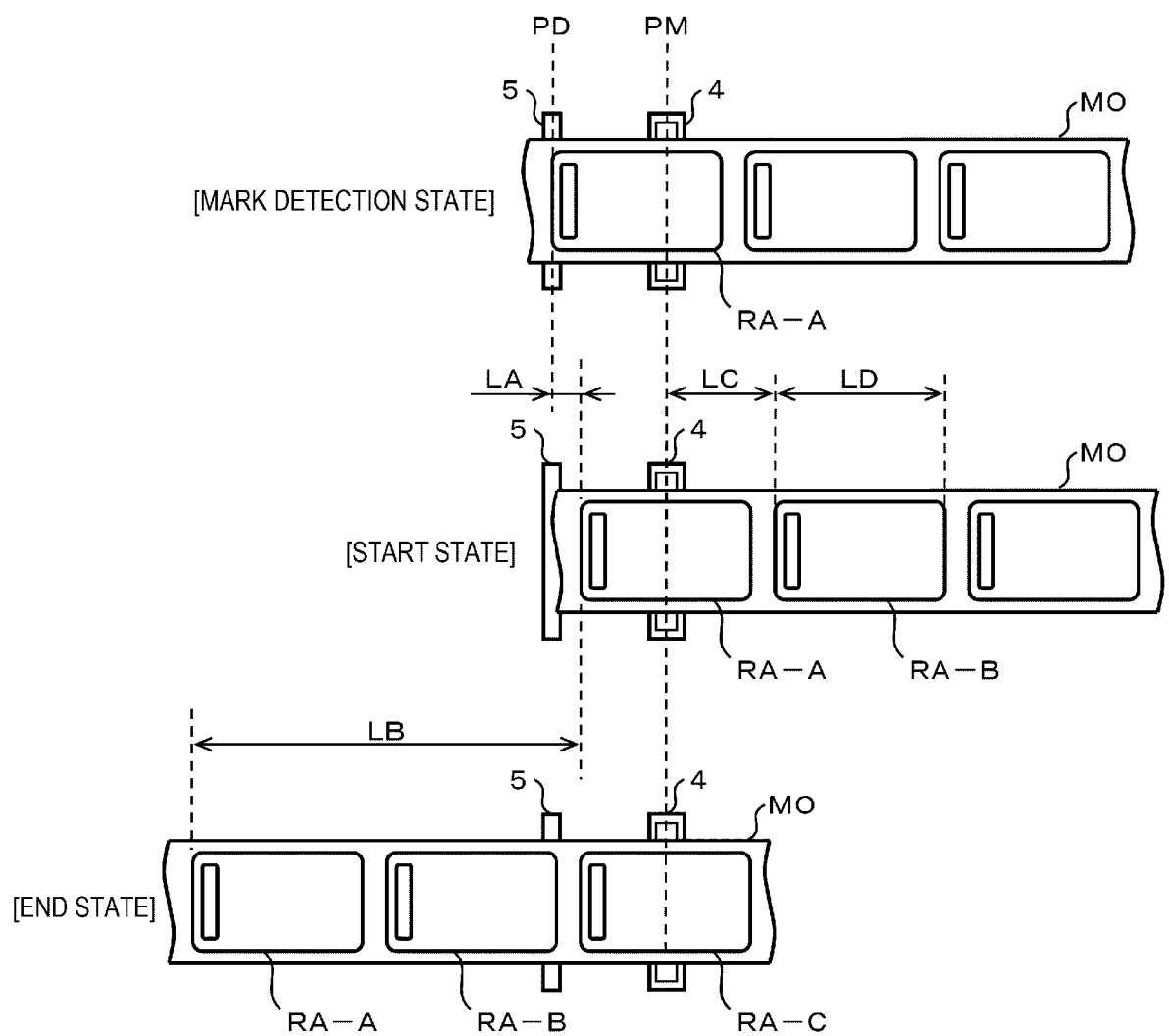
FIG. 4 is a diagram illustrating a transition state of a mount for calibration in the first embodiment.

FIG. 4 is a diagram illustrating state transition of the mount MO for calibration.

In FIG. 4, a state of the mount MO at a point in time when the forward-feed explained above is ended is illustrated on the upper side. That is, the leading end of one label paper RA indicated by a sign RA-A in FIG. 4 among the plurality of label papers RA is located in the detection position PD.

Subsequently, the CPU 171 instructs the motor driving circuit 8 to convey the mount MO in the back direction by a first specified amount LA (hereinafter referred to as back-feed). According to the instruction, the motor driving circuit 8 rotates the motor 7 by a rotation amount corresponding to the first specified amount LA to back-feed the mount MO. The conveying roller 1 rotates counterclockwise with a rotational force of the motor 7 at this time and back-feeds the mount MO by the first specified amount LA. The first specified amount LA is calculated as a difference between an interval between the detection position PD and the center position PM and a half of the length of the label paper RA in the longitudinal direction.

In FIG. 4, a state of the mount MO at a point in time when the back-feed explained above is ended is illustrated in the center. This state is the start state.

In ACT 12, the CPU 171 acquires an RSSI and an identifier output from the reader writer 10 and saves the RSSI and the identifier in, for example, an internal memory of the main controller 17. At this time, the CPU 171 corelates a feed amount=0 with the RSSI and the identifier. If a plurality of sets of RSSIs and identifiers are output from the reader writer 10, the CPU 171 acquires and saves all of the plurality of sets of RSSIs and identifiers.

In ACT 13, the CPU 171 instructs the motor driving circuit 8 to forward-feed the mount MO by a second specified amount. According to the instruction, the motor driving circuit 8 rotates the motor 7 by a rotation amount corresponding to the second specified amount. It is assumed that the second specified amount is set to, for example, 1 cm. However, the second specified amount may be optionally set by, for example, a designer of the label printer 100.

In ACT 14, the CPU 171 acquires an RSSI and an identifier output from the reader writer 10 and saves the RSSI and the identifier in, for example, the internal memory of the main controller 17. At this time, the CPU 171 corelates a feed amount from the start state with the RSSI and the identifier. If a plurality of sets of RSSIs and identifiers are output from the reader writer 10, the CPU 171 acquires and saves all of the plurality of sets of RSSIs and identifiers.

In ACT 15, the CPU 171 confirms whether the calibration is in an end state. The end state is, for example, a state in which the feed amount from the start state is a third specified amount LB. It is assumed that the third specified amount LB is set to, for example, a double of the pitch PI. However, the third specified amount LB may be optionally set by, for example, the designer of the label printer 100. If failing in confirming that the calibration is in the end state, the CPU 171 determines NO and returns to ACT 13. That is, in a collection period from the start state to the end state, the CPU 171 collects an RSSI and an identifier every time the CPU 171 forward-feeds the mount MO by the second specified amount. The CPU 171 executes the information processing based on the information processing program in this way. Consequently, the computer including the CPU 171 as the central part functions as an acquiring unit.

In FIG. 4, a state of the mount MO at a point in time when the forward-feed explained above is ended is illustrated on the lower side. That is, the center of one label paper RA indicated by a sign RA-C in FIG. 4 among the plurality of label papers RA is located in the center position PM of the antenna 4. The label paper RA-C is the second label paper RA following a label paper RA-A. This state is the end state. If failing in confirming that the calibration is in such an end state, the CPU 171 determines YES in ACT 15 and proceeds to ACT 16.

In ACT 16, the CPU 171 determines, considering the RSSI acquired in ACT 12 and the RSSIs collected by repeating ACT 14, an intermediate position between a position of the mount MO in the start state and a position of the mount MO in the end state. For example, the CPU 171 determines the intermediate position as a position that bisects, at an area ratio, in a horizontal axis direction, a polygon formed between line graphs of a plurality of RSSIs and the horizontal axis of RSSI=0 acquired, concerning each of identifiers acquired in the collection period, together with the identifier. For example, the CPU 171 determines a feed amount equivalent to the intermediate position as an indicator value of the intermediate position. The line graphs of the RSSIs are line graphs formed by plotting the RSSIs with the vertical axis indicating the magnitude of an RSSI and the horizontal axis indicating a feed amount on the horizontal axis.

Figure 5:
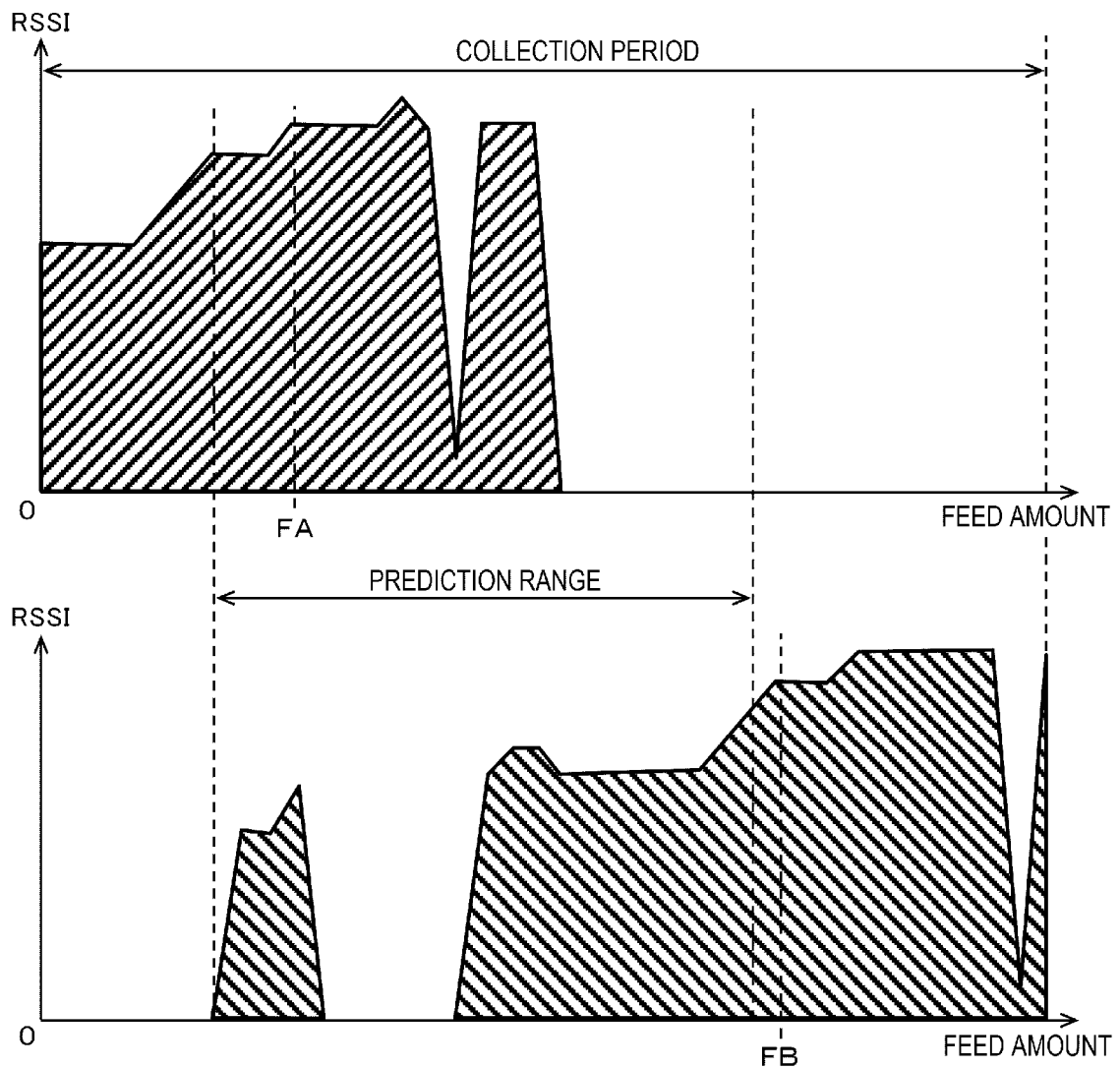
FIG. 5 is a diagram illustrating line graphs of RSSIs concerning two wireless tags.

FIG. 5 is a diagram illustrating line graphs of RSSIs concerning the wireless tags TA at the time when RSSIs concerning two wireless tags TA are successfully collected.

In the following explanation concerning FIG. 5, the wireless tag TA concerning the line graph illustrated on the upper side is referred to as first wireless tag TA and the wireless tag TA concerning the line graph illustrated on the lower side is referred to as second wireless tag TA. As an example, the wireless tag TA attached to a label paper RA-B illustrated in FIG. 4 is the first wireless tag TA and the wireless tag TA attached to the label paper RA-C illustrated in FIG. 4 is the second wireless tag TA.

Concerning the first wireless tag TA, the CPU 171 determines a feed amount FA as a feed amount equivalent to a position that bisects, at an area ratio, a hatching region illustrated on the upper side in the horizontal axis direction. Concerning the second wireless tag TA, the CPU 171 determines a feed amount FB as a feed amount equivalent to a position that bisects, at an area ratio, a hatching region illustrated on the lower side in the horizontal axis direction. However, since the RSSI is acquired every time the mount MO is conveyed by the second specified amount, if the feed amount FA and the feed amount FB are values integer times as large as the second specified amount, the hatching region sometimes cannot be bisected at the area ratio in the horizontal axis direction. Therefore, in this case, a state in which the areas of respective two regions across the feed amount FA or the feed amount FB are the closest is regarded as the bisection.

The area of a hatching region illustrated in FIG. 5 is proportional to a sum of electric field intensities illustrated in the hatching region. Therefore, a position that bisects the hatching region at an area ratio in the horizontal axis direction is an example of the intermediate position between the start position and the end position of the collection period. The position is a position where a sum of RSSIs collected while the mount MO is conveyed from the start position to the intermediate position and a sum of RSSIs collected while the mount MO is conveyed from the intermediate position to the end position are the closest. The CPU 171 executes the information processing based on the information processing program in this way. Consequently, the computer including the CPU 171 as the central part functions as a determining unit.

In ACT 17, the CPU 171 confirms whether a plurality of intermediate positions present in a prediction range are present in the intermediate position determined in ACT 16. The prediction range is a range from when the leading end of any label paper RA reaches the center position PM until when the trailing end of the label paper RA reaches the center position PM in the collection period.

As explained above and illustrated in FIG. 4, in the start state, the center of the label paper RA-A is located in the center position PM of the antenna 4. If the forward-feed is performed from this state over a length LC calculated by subtracting a half of the length of the label paper RA in the conveying direction of the mount MO from the pitch PI, the leading end of the label paper RA immediately following the label paper RA-A reaches the center position PM. The label paper RA immediately following the label paper RA-A is illustrated with a sign RA-B in FIG. 4. If the forward-feed is further performed over a length LD of the label paper RA in the longitudinal direction, the trailing end of the label paper RA-B reaches the center position PM. Therefore, the prediction range is a range in which the feed amount is the length LC to LC+LD.

In an example illustrated in FIG. 5, the feed amount FA is within the prediction range and the feed amount FB is not within the prediction range. Therefore, since only one intermediate position is located within the prediction range, the CPU 171 determines NO in ACT 17 in FIG. 3 and proceeds to ACT 18.

In ACT 18, the CPU 171 selects the wireless tag TA concerning the one intermediate position located in the prediction range as a calibration target wireless tag (hereinafter referred to as target tag). For example, in the example illustrated in FIG. 5, the CPU 171 selects the first wireless tag TA as the target tag.

On the other hand, if a plurality of intermediate positions are located within the prediction range, the CPU 171 determines YES in ACT 17 in FIG. 3 and proceeds to ACT 19.

In ACT 19, the CPU 171 selects, out of the plurality of intermediate positions located within the prediction range, an intermediate position having the smallest feed amount representing the intermediate position and selects the wireless tag TA concerning the intermediate position as the target tag. For example, if it is assumed that the feed amount FB illustrated in FIG. 5 is also within the prediction range, since the feed amount FA is smaller than the feed amount FB, the CPU 171 selects the first wireless tag TA corresponding to the feed amount FA as the target tag.

As explained above, the CPU 171 selects a wireless tag, an intermediate position of which is determined as a position within the prediction range, as the target tag. The CPU 171 executes the information processing based on the information processing program in this way. Consequently, the computer including the CPU 171 as the central part functions as a selecting unit.

If the CPU 171 selects the target tag in ACT 18 or ACT 19 in FIG. 3, the CPU 171 proceeds to ACT 20.

In ACT 20, the CPU 171 decides, concerning the target tag, based on the RSSIs collected in ACT 12 and ACT 14, a relative positional relation between the target tag and the antenna 4 at the time when data is written in the target tag. For example, well-known processing can be directly used as this processing. The CPU 171 executes the information processing based on the information processing program in this way. Consequently, the computer including the CPU 171 as the central part functions as a deciding unit.

Thereafter, the CPU 171 ends the information processing for the calibration.

As explained above, with the label printer 100, based on the collected RSSIs, the wireless tag TA having a better communication condition is selected as the target tag out of the plurality of wireless tags TA present near the antenna 4 and, then, an optimum relative positional relation between the wireless tag and the antenna 4 is determined based on a communication state with the target tag. Therefore, the determination can be properly performed.

Second Embodiment

Figure 6:
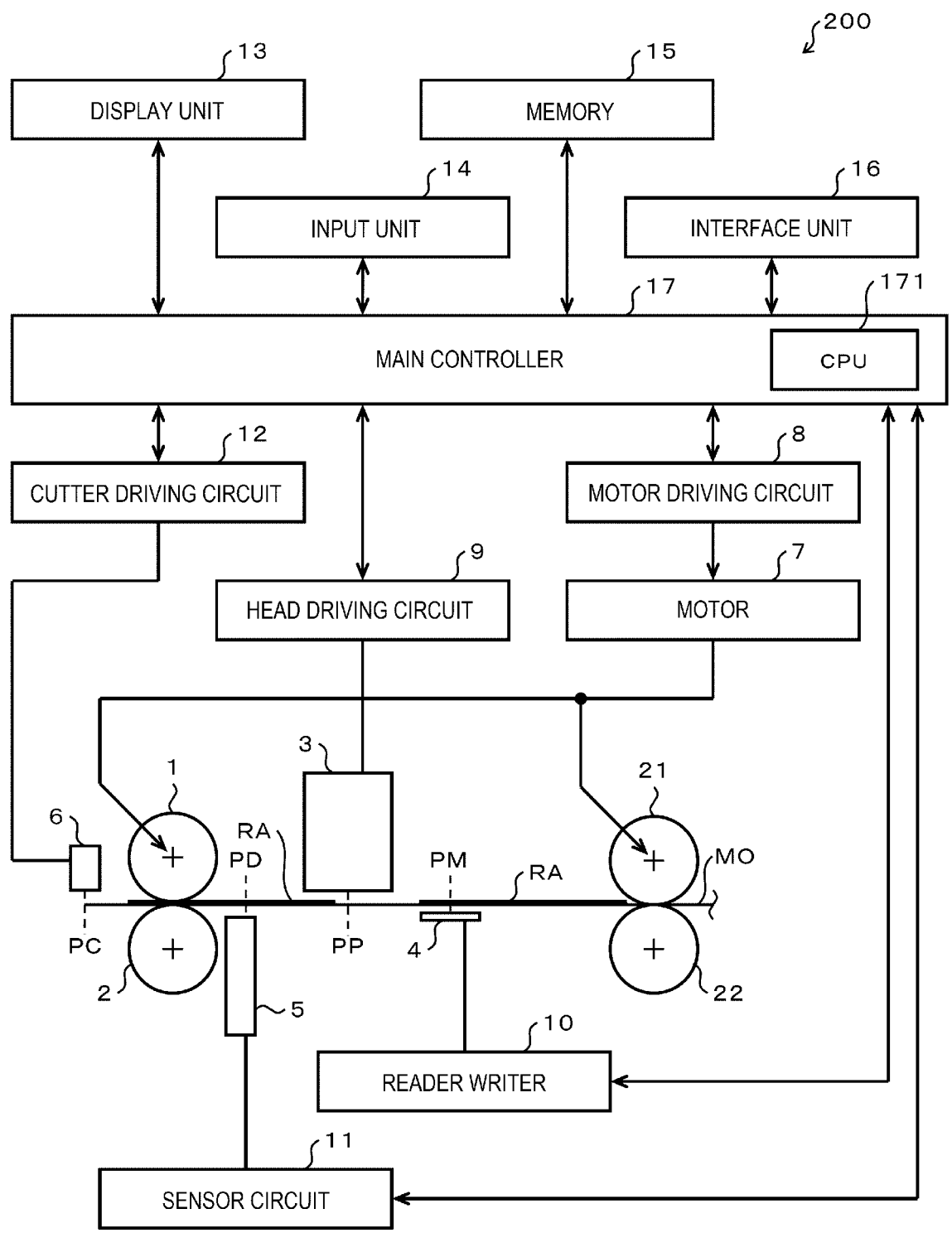
FIG. 6 is a diagram illustrating the structure of a part of and a main part circuit configuration of a label printer according to a second embodiment.

FIG. 6 is a diagram illustrating the structure of a part of and a main part circuit configuration of a label printer 200 according to a second embodiment. In FIG. 6, the same components as the components illustrated in FIG. 1 are denoted by the same reference numerals and signs and detailed explanation of the components is omitted.

A hardware configuration of the label printer 200 is different from the label printer 100 in that the hardware configuration of the label printer 200 further includes conveying rollers 21 and 22.

The conveying rollers 21 and 22 are disposed to be opposed to each other in a state in which axes of both of the conveying rollers 21 and 22 are directed in the depth direction in FIG. 6. The conveying rollers 21 and 22 hold the mount MO and convey the mount MO according to rotation around the axes. Both of the conveying rollers 21 and 22 are capable of rotating clockwise and counterclockwise in FIG. 6 and capable of conveying the mount MO in both of the forward direction and the back direction. The conveying roller 21 receives a rotational force of the motor 7 and rotates synchronously with the conveying roller 1. The rotational force generated by the motor 7 may be transmitted to the conveying roller 22 via a gear or the like to rotate the conveying roller 22. In this way, in the label printer 200, a function of a conveying unit that conveys a mount is realized by the conveying rollers 21 and 22 in addition to the conveying rollers 1 and 2, the motor 7, and the motor driving circuit 8.

The label printer 200 is different from the label printer 100 in information processing executed by the CPU 171 for calibration.

Figure 7:
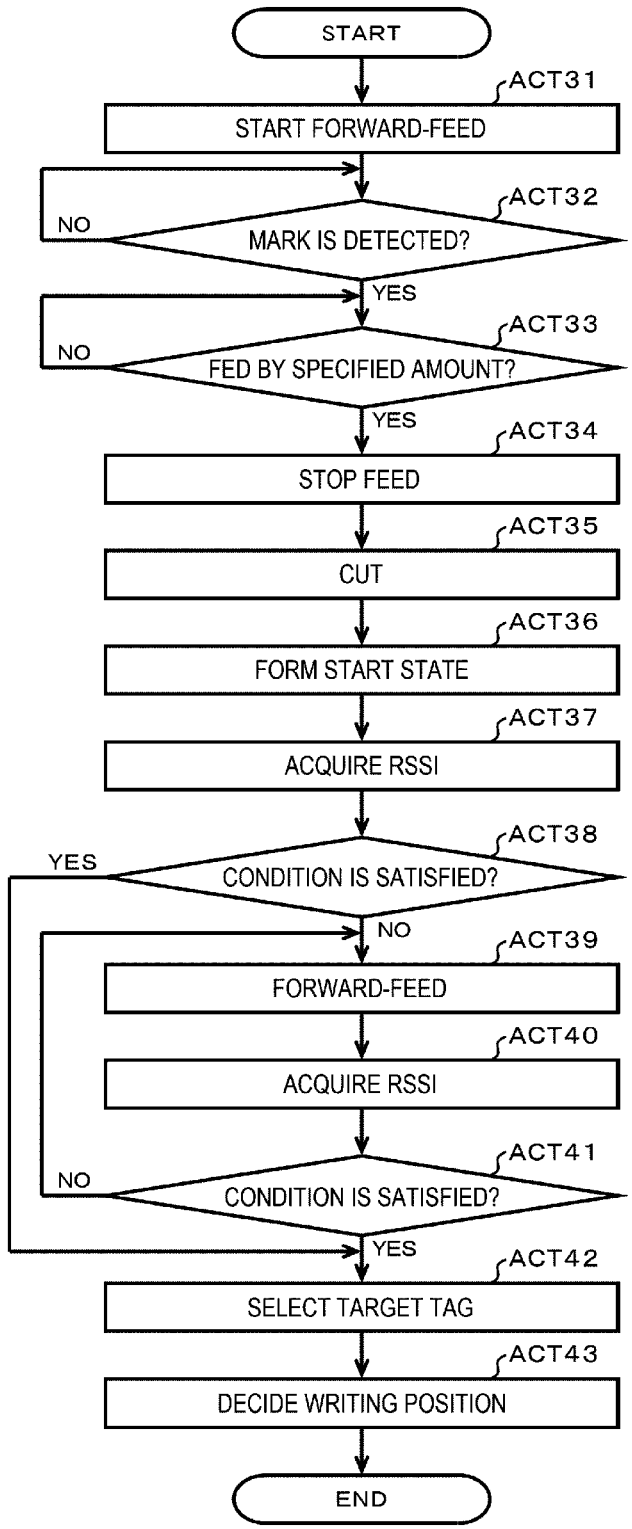
FIG. 7 is a flowchart of information processing by a CPU in FIG. 6 for calibration.

FIG. 7 is a flowchart of the information processing by the CPU 171 for the calibration.

In ACT 31, the CPU 171 starts forward-feed of the mount MO. For example, the CPU 171 instructs the motor driving circuit 8 to start the forward-feed. According to the instruction, the motor driving circuit 8 rotates the motor 7 to forward-feed the mount MO. If the motor 7 starts rotation, the conveying rollers 1 and 21 rotate clockwise with a rotational force of the rotation and forward-feed the mount MO.

In ACT 32, the CPU 171 waits for the mark MA to be detected. If the mark MA reaches the detection position PD and a change occurs in an output of the mark sensor 5, the sensor circuit 11 detects the mark MA in response to the change in the output. The sensor circuit 11 detects the mark MA in this way. According to the detection of the mark MA, the CPU 171 determines YES and proceeds to ACT 33.

Figure 8:
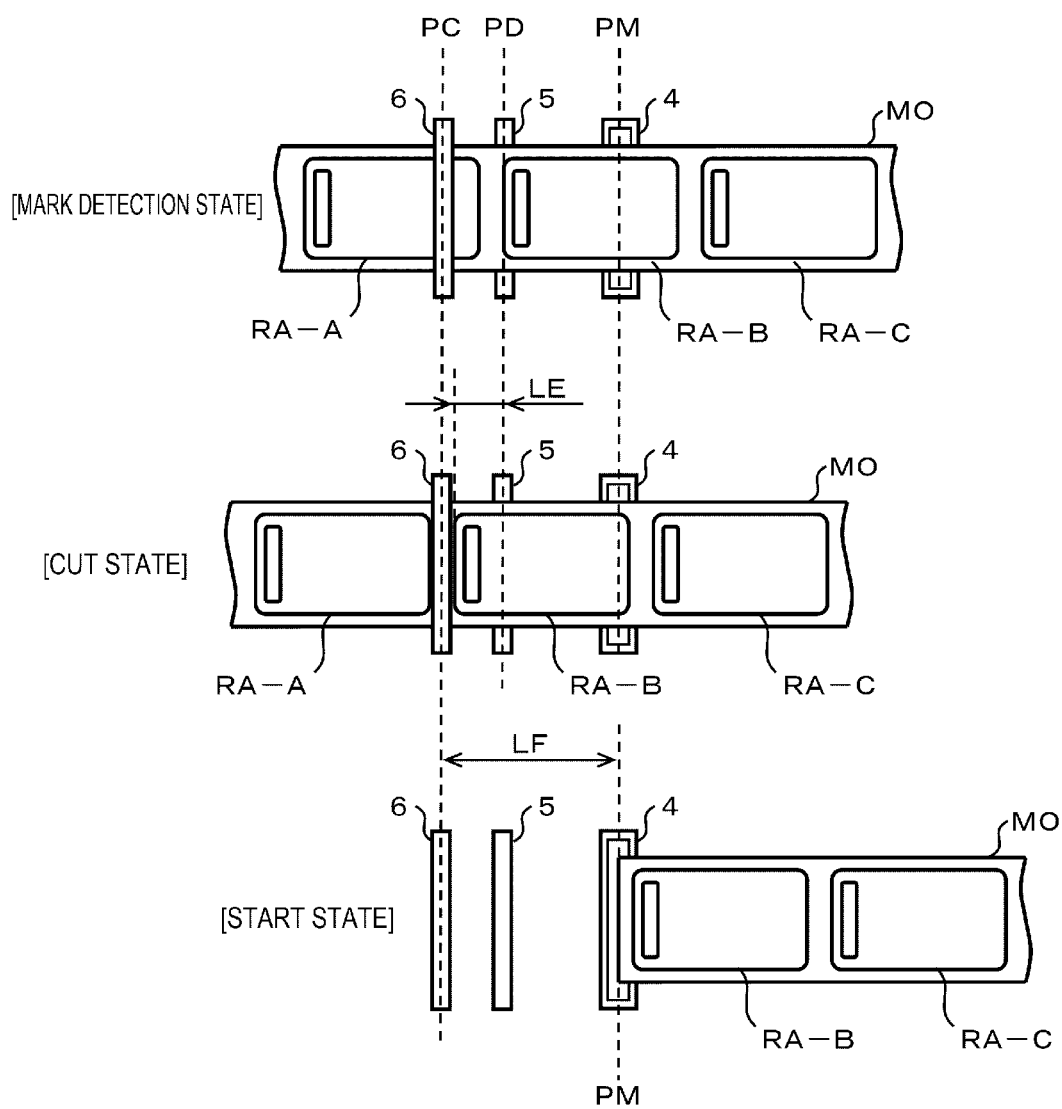
FIG. 8 is a diagram illustrating a state transition of a mount for calibration in the second embodiment.

FIG. 8 is a diagram illustrating a state transition of the mount MO for calibration.

In FIG. 8, a state of the mount MO at a point in time when the mark MA is detected as explained above is illustrated on the upper side. That is, the leading end of one label paper RA indicated by a sign RA-B in FIG. 8 among a plurality of label papers RA is located in the detection position PD.

In ACT 33, after the mark MA is detected, the CPU 171 waits for the mount MO to be further forward-fed by a fourth specified amount LE. The fourth specified amount LE is set as an amount shorter than an interval between the detection position PD and the cut position PC, a sum of an interval between the label papers RA adjacent to each other and the fourth specified amount LE being larger than an interval between the detection position PD and the cut position PC. The fourth specified amount LE may be set as a value common to all types of label papers by, for example, a designer of the label printer 200. Alternatively, the fourth specified amount LE may be set by the CPU 171 according to a type of an attached label paper RA considering an interval between the label papers RA adjacent to each other. The CPU 171 may acquire an interval between the label papers RA for each type of the label paper RA according to, for example, an input of a value from the input unit 14 or may acquire the value by reading out a value correlated with a type of the label paper RA and described in a database set in a storage device provided on the inside or the outside of the label printer 200. If the mount MO is forward-fed by the fourth specified amount LE, the CPU 171 determines YES and proceeds to ACT 34.

In ACT 34, the CPU 171 stops the forward-feed of the mount MO. For example, the CPU 171 instructs the motor driving circuit 8 to stop the motor 7. According to the instruction, the motor driving circuit 8 stops the motor 7, whereby the forward-feed of the mount MO is stopped.

In FIG. 8, a state of the mount MO at a point in time when the forward-feed explained above is ended is illustrated in the center. As illustrated in FIG. 8, a part between the label paper RA-B and the label paper RA-A preceding and adjacent to the label paper RA-B is located in the cut position PC.

In ACT 35, the CPU 171 cuts the mount MO. For example, the CPU 171 instructs the cutter driving circuit 12 to cut the mount MO. According to the instruction, the cutter driving circuit 12 drives the cutter 6. The cutter 6 cuts off a part of the mount MO located further on the downstream side in the forward direction than the cut position PC. Consequently, the label paper RA-A is cut off. The cut-off label paper RA-A is discharged to, for example, the outside of the label printer 200. The cutter 6 cuts the mount MO in a direction crossing the array direction of the wireless tags TA and is equivalent to a cutting unit.

In ACT 36, the CPU 171 forms a start state. The start state is, for example, a state in which an end portion of the mount MO formed anew by cutting off a part of the mount MO as explained above is aligned with the center position PM of the antenna 4. For example, the CPU 171 instructs the motor driving circuit 8 to back-feed the mount MO by a fifth specified amount LF. According to the instruction, the motor driving circuit 8 rotates the motor 7 by a rotation amount corresponding to the fifth specified amount LF to back-feed the mount MO. The conveying rollers 1 and 21 rotate counterclockwise with a rotational force of the motor 7 at this time and back-feed the mount MO by the fifth specified amount LF. The fifth specified amount LF is an interval between the cut position PC and the center position PM.

In FIG. 8, a state of the mount MO at a point in time when the back-feed explained above is ended is illustrated on the lower side. This state is the start state.

In ACT 37, the CPU 171 acquires an RSSI and an identifier output from the reader writer 10. If a plurality of sets of RSSIs and identifiers are output from the reader writer 10, the CPU 171 acquires all of the plurality of sets of RSSIs and identifiers. The CPU 171 executes the information processing based on the information processing program in this way. Consequently, a computer including the CPU 171 as a central part functions as an acquiring unit.

In ACT 38, the CPU 171 confirms whether a predetermined condition is satisfied concerning the RSSI acquired in ACT 37. The condition is determined in advance by, for example, the designer of the label printer 200 as a condition for determining whether the RSSI has magnitude enough for satisfactorily performing communication. As an example, the condition is "the RSSI is equal to or larger than a predetermined threshold". If failing in confirming that the condition is satisfied, the CPU 171 determines NO and proceeds to ACT 39.

In ACT 39, the CPU 171 instructs the motor driving circuit 8 to forward-feed the mount MO by a sixth specified amount. According to the instruction, the motor driving circuit 8 rotates the motor 7 by a rotation amount corresponding to the sixth specified amount. It is assumed that the sixth specified amount is set to, for example, 1 cm. However, the sixth specified amount may be optionally set by, for example, the designer of the label printer 200.

As explained above, in ACT 36 and ACT 39, after setting the end portion of the mount MO, which is formed by being cut by the cutter 6, to be opposed to the antenna 4, the CPU 171 controls a conveying unit configured by the conveying rollers 1 and 2, the motor 7, the motor driving circuit 8, and the conveying rollers 21 and 22 to convey the mount MO while causing the mount MO to pass a position opposed to the antenna 4. That is, the CPU 171 executes the information processing based on the information processing program. Consequently, the computer including the CPU 171 as the central part functions as a control unit.

In ACT 40, the CPU 171 acquires an RSSI and an identifier output from the reader writer 10. If a plurality of sets of RSSIs and identifiers are output from the reader writer 10, the CPU 171 acquires all of the plurality of sets of RSSIs and identifiers.

In ACT 41, as in ACT 38, the CPU 171 confirms whether the condition is satisfied. If failing in confirming that the condition is satisfied, the CPU 171 determines NO and returns to ACT 39. That is, the CPU 171 repeatedly acquires RSSIs while forward-feeding the mount MO by the sixth specified amount and waits for the condition to be satisfied concerning the RSSIs.

If confirming that the condition is satisfied concerning an RSSI acquired immediately before in ACT 37 or ACT 40, the CPU 171 determines YES in ACT 38 or ACT 41 and proceeds to ACT 42.

In ACT 42, the CPU 171 selects, as a target tag, the wireless tag TA identified by an identifier acquired together with the RSSI concerning which the condition is satisfied. The CPU 171 executes the information processing based on the information processing program in this way. Consequently, the computer including the CPU 171 as the central part functions as a selecting unit.

In ACT 43, the CPU 171 collects RSSIs concerning the target tag while changing the position of the target tag and decides, based on the collected RSSIs, a relative positional relation between the target tag and the antenna 4 at the time when data is written in the target tag. As this processing, for example, well-known processing can be directly used. The RSSIs acquired in ACT 37 and ACT 40 may be saved. In ACT 43, RSSI values other than the RSSIs may be collected. The CPU 171 executes the information processing based on the information processing program in this way. Consequently, the computer including the CPU 171 as the central part functions as a deciding unit.

Thereafter, the CPU 171 ends the information processing for the calibration.

As explained above, with the label printer 200, based on the collected RSSIs, the wireless tag TA having a better communication condition is selected as the target tag out of the plurality of wireless tags TA present near the antenna 4 and, then, an optimum relative positional relation between the wireless tag and the antenna 4 is determined based on a communication state with the target tag. Therefore, the determination can be properly performed.

With the label printer 200, the processing for selecting the target tag is simpler compared with the label printer 100 and a load on the CPU 171 can be reduced. However, in the label printer 200, the conveying rollers 21 and 22 are provided because a back-feed amount for forming the start state is larger than the back-feed amount in the label printer 100. Therefore, a hardware configuration is more complicated than the label printer 100.

Various modified implementations explained below of the embodiments are possible.

The graph used for determining the intermediate position in the first embodiment may be a graph of another form such as a histogram if an area corresponding to the magnitude of an RSSI is generated.

The determination of the intermediate position in the first embodiment can also be realized by an arithmetic operation in which a graph is not used.

The first embodiment may be realized as a tag writing device that does not include a print function for printing on the label paper RA and writes data in the wireless tag TA.

The reception intensity may be measured as an indicator value different from the RSSI.

The several embodiments are explained above. However, these embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A tag writing device, comprising:
    a conveying component configured to convey a mount, to which a plurality of wireless tags are attached in a row at about equal intervals, along an array direction of the plurality of wireless tags;
    an antenna opposed to the mount conveyed by the conveying component, the antenna being provided for wireless communication with a plurality of wireless tags located within a communication range among the plurality of wireless tags;
    an acquiring component configured to acquire, in a period in which the mount is conveyed by the conveying component from a predetermined start position to a predetermined end position, a plurality of times each time the mount is conveyed by the conveying component by a fixed amount, reception intensities in the antenna of radio signals transmitted from the plurality of wireless tags;
    a determining component configured to determine, concerning each of the plurality of wireless tags, an intermediate position between the start position and the end position as a position where a sum of reception intensities acquired by the acquiring component while the mount is conveyed from the start position to the intermediate position by the conveying component and a sum of reception intensities acquired by the acquiring component while the mount is conveyed from the intermediate position to the end position by the conveying component are closest;
a selecting component configured to select, as a target tag, the wireless tag, the intermediate position of which is determined by the determining component as a position within a prediction range predetermined as a range included in a range between the start position and the end position; and
a deciding component configured to decide, based on reception intensity in the antenna of a radio signal transmitted from the target tag selected by the selecting component, a relative positional relation between the wireless tag and the antenna at a time when writing is performed in one of the plurality of wireless tags.

2. The tag writing device according to claim 1, wherein the determining component determines the intermediate position by an arithmetic operation.

3. The tag writing device according to claim 1, wherein the plurality of wireless tags are attached in at about 1 cm intervals.

4. The tag writing device according to claim 1, wherein the plurality of wireless tags are radio frequency identification wireless tags.

5. A label printer, comprising:
a conveying component configured to convey a mount, to which a plurality of label papers respectively attached with wireless tags are stuck in a row at about equal intervals, along an array direction of the plurality of label papers;
a print component configured to print an image on the label paper;
an antenna opposed to the mount conveyed by the conveying component, the antenna being provided for wireless communication with a plurality of wireless tags located within a communication range among the plurality of wireless tags;
an acquiring component configured to acquire, in a period in which the mount is conveyed by the conveying component from a predetermined start position to a predetermined end position, a plurality of times each time the mount is conveyed by the conveying component by a fixed amount, reception intensities in the antenna of radio signals transmitted from the plurality of wireless tags;
a determining component configured to determine, concerning each of the plurality of wireless tags, an intermediate position between the start position and the end position as a position where a sum of reception intensities acquired by the acquiring component while the mount is conveyed from the start position to the intermediate position by the conveying component and a sum of reception intensities acquired by the acquiring component while the mount is conveyed from the intermediate position to the end position by the conveying component are closest;
a selecting component configured to select, as a target tag, the wireless tag, the intermediate position of which is determined by the determining component as a position within a prediction range predetermined as a range included in a range between the start position and the end position;
a deciding component configured to decide, based on reception intensity in the antenna of a radio signal transmitted from the target tag selected by the selecting component, a relative positional relation between the wireless tag and the antenna at a time when writing is performed in one of the plurality of wireless tags; and
a transmitting component configured to, if a relative positional relation between a wireless tag, which is one of the plurality of wireless tags, and the antenna is the positional relation decided by the deciding component, cause the antenna to transmit a radio wave for writing data in the wireless tag.

6. The label printer according to claim 5, wherein the determining component determines the intermediate position by an arithmetic operation.

7. The label printer according to claim 5, wherein the plurality of wireless tags are attached in at about 1 cm intervals.

8. The label printer according to claim 5, wherein the plurality of wireless tags are radio frequency identification wireless tags.

9. The label printer according to claim 5, wherein the print component is a thermal-type print head.

10. An information processing method for a tag writing device, comprising:
acquiring, in a period in which a mount, to which a plurality of wireless tags are attached in a row at equal intervals, along an array direction of the plurality of wireless tags, is conveyed by a conveying component from a predetermined start position to a predetermined end position, a plurality of times each time the mount is conveyed by the conveying component by a fixed amount, reception intensities in an antenna of radio signals transmitted from the plurality of wireless tags, the antenna being provided for wireless communication with a plurality of wireless tags located within a communication range among the plurality of wireless tags;
determining, concerning each of the plurality of wireless tags, an intermediate position between the start position and the end position as a position where a sum of reception intensities acquired while the mount is conveyed from the start position to the intermediate position by the conveying component and a sum of reception intensities acquired while the mount is conveyed from the intermediate position to the end position by the conveying component are closest;
selecting, as a target tag, the wireless tag, the intermediate position of which is determined as a position within a prediction range predetermined as a range included in a range between the start position and the end position; and
deciding, based on reception intensity in the antenna of a radio signal transmitted from the selected target tag, a relative positional relation between the wireless tag and the antenna at a time when writing is performed in one of the plurality of wireless tags.

11. A tag writing device, comprising:
a conveying component configured to convey a mount, to which a plurality of wireless tags are attached in a row at about equal intervals, along an array direction of the plurality of wireless tags;
an antenna opposed to the mount conveyed by the conveying component, the antenna being provided for wireless communication with one or a plurality of wireless tags located within a communication range among the plurality of wireless tags;

a cutting component configured to cut the mount in a direction crossing the array direction;

a controller configured to set an end portion of the mount formed by being cut by the cutting unit to be opposed to the antenna and, thereafter, control the conveying component to convey the mount while causing the mount to pass a position opposed to the antenna;

an acquiring component configured to, if the mount is conveyed by the conveying component while passing the position opposed to the antenna, acquire, a plurality of times, reception intensities in the antenna of radio signals transmitted from the plurality of wireless tags;

a selecting component configured to, if reception intensity matching a predetermined condition is acquired by the acquiring component, select, as a target tag, one wireless tag that transmits a radio signal for generating the reception intensity in the antenna among the plurality of wireless tags; and a deciding component configured to decide, based on reception intensity in the antenna of a radio signal transmitted from the target tag selected by the selecting component, a relative positional relation between the wireless tag and the antenna at a time when writing is performed in one of the plurality of wireless tags.

12. The tag writing device according to claim 11, wherein the determining component determines the intermediate position by an arithmetic operation.

13. The tag writing device according to claim 11, wherein the plurality of wireless tags are attached in at about 1 cm intervals.

14. The tag writing device according to claim 11, wherein the plurality of wireless tags are radio frequency identification wireless tags.

15. A label printer, comprising:

a conveying component configured to convey a mount, to which a plurality of label papers respectively attached with wireless tags are stuck in a row at about equal intervals, along an array direction of the plurality of label papers;

a print component configured to print an image on the label paper;

an antenna opposed to the mount conveyed by the conveying component, the antenna being provided for wireless communication with one or a plurality of wireless tags located within a communication range among the plurality of wireless tags;

a cutting component configured to cut the mount in a direction crossing the array direction;

a controller configured to set an end portion of the mount formed by being cut by the cutting component to be opposed to the antenna and, thereafter, control the conveying unit to convey the mount while causing the mount to pass a position opposed to the antenna;

an acquiring component configured to, if the mount is conveyed by the conveying component while being caused to pass the position opposed to the antenna, acquire, a plurality of times, reception intensities in the antenna of radio signals transmitted from the plurality of wireless tags;

a selecting component configured to, if reception intensity matching a predetermined condition is acquired by the acquiring component, select, as a target tag, one wireless tag that transmits a radio signal for generating the reception intensity in the antenna among the plurality of wireless tags;

a deciding component configured to decide, based on reception intensity in the antenna of a radio signal transmitted from the target tag selected by the selecting component, a relative positional relation between the wireless tag and the antenna at a time when writing is performed in one of the plurality of wireless tags; and a transmitting component configured to, if a relative positional relation between a wireless tag, which is one of the plurality of wireless tags, and the antenna is the positional relation decided by the deciding component, cause the antenna to transmit a radio wave for writing data in the wireless tag.

16. The label printer according to claim 15, wherein the determining component determines the intermediate position by an arithmetic operation.

17. The label printer according to claim 15, wherein the plurality of wireless tags are attached in at about 1 cm intervals.

18. The label printer according to claim 15, wherein the plurality of wireless tags are radio frequency identification wireless tags.

19. The label printer according to claim 15, wherein the print component is a thermal-type print head.

20. An information processing method for a tag writing device, comprising:

setting an end portion of a mount, to which a plurality of wireless tags are attached in a row at equal intervals, along an array direction of the plurality of wireless tags, formed by being cut by a cutting component, the configured to cut the mount in a direction crossing the array direction, opposed to the antenna and, thereafter, controlling the conveying component to convey the mount while causing the mount to pass a position opposed to an antenna, the antenna being provided for wireless communication with one or a plurality of wireless tags located within a communication range among the plurality of wireless tags;

if the mount is conveyed by the conveying component while passing the position opposed to the antenna, acquiring, a plurality of times, reception intensities in the antenna of radio signals transmitted from the plurality of wireless tags;

if reception intensity matching a predetermined condition is acquired, selecting, as a target tag, one wireless tag that transmits a radio signal for generating the reception intensity in the antenna among the plurality of wireless tags; and deciding, based on reception intensity in the antenna of a radio signal transmitted from the selected target tag, a relative positional relation between the wireless tag and the antenna at a time when writing is performed in one of the plurality of wireless tags.

\* \* \* \* \*